July 3, 1945.　　　　　P. KIECHLE　　　　　2,379,642
SAW GRINDING DEVICE
Filed Oct. 14, 1943　　　5 Sheets-Sheet 1
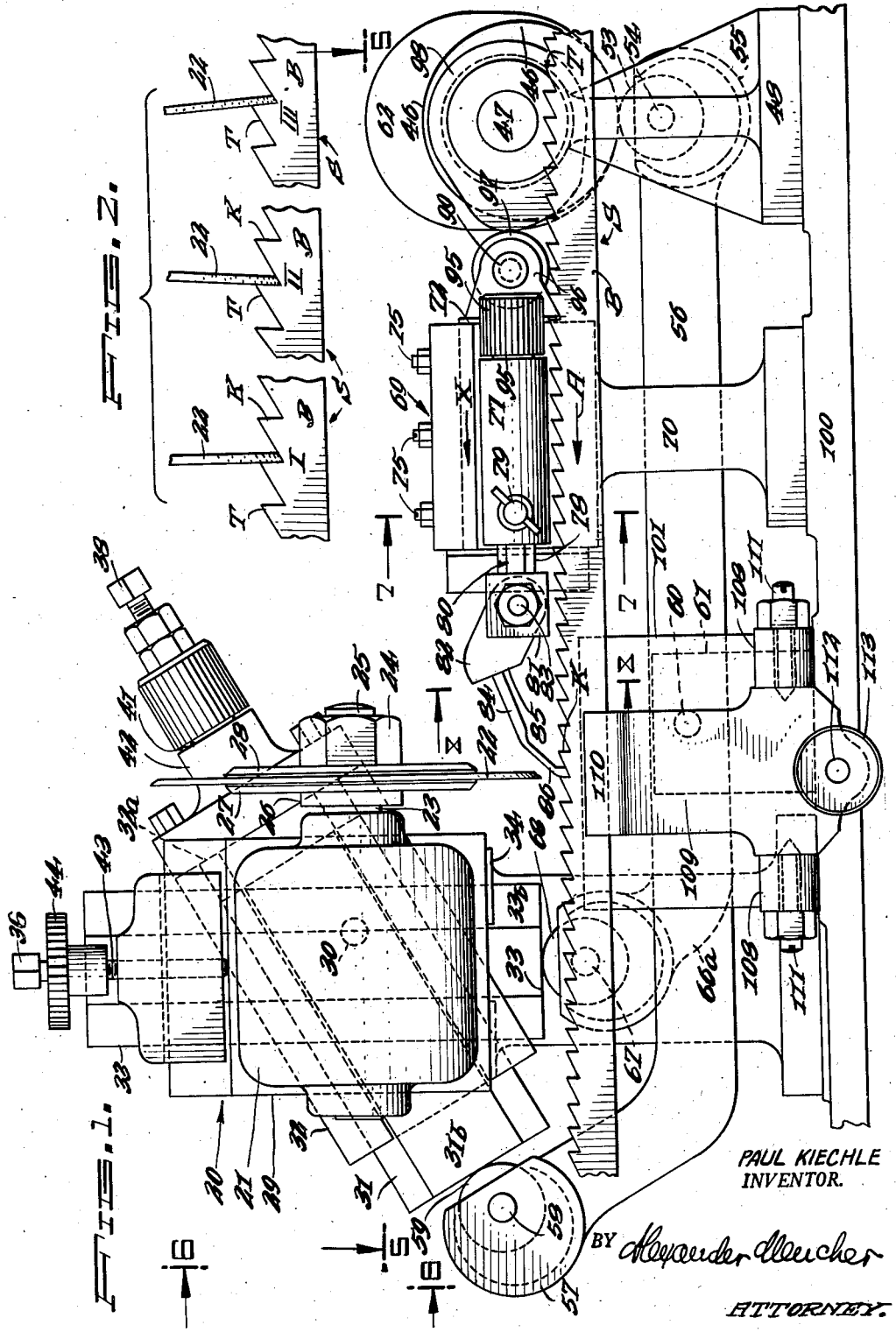
PAUL KIECHLE
INVENTOR.
BY *Alexander Mercher*
ATTORNEY.

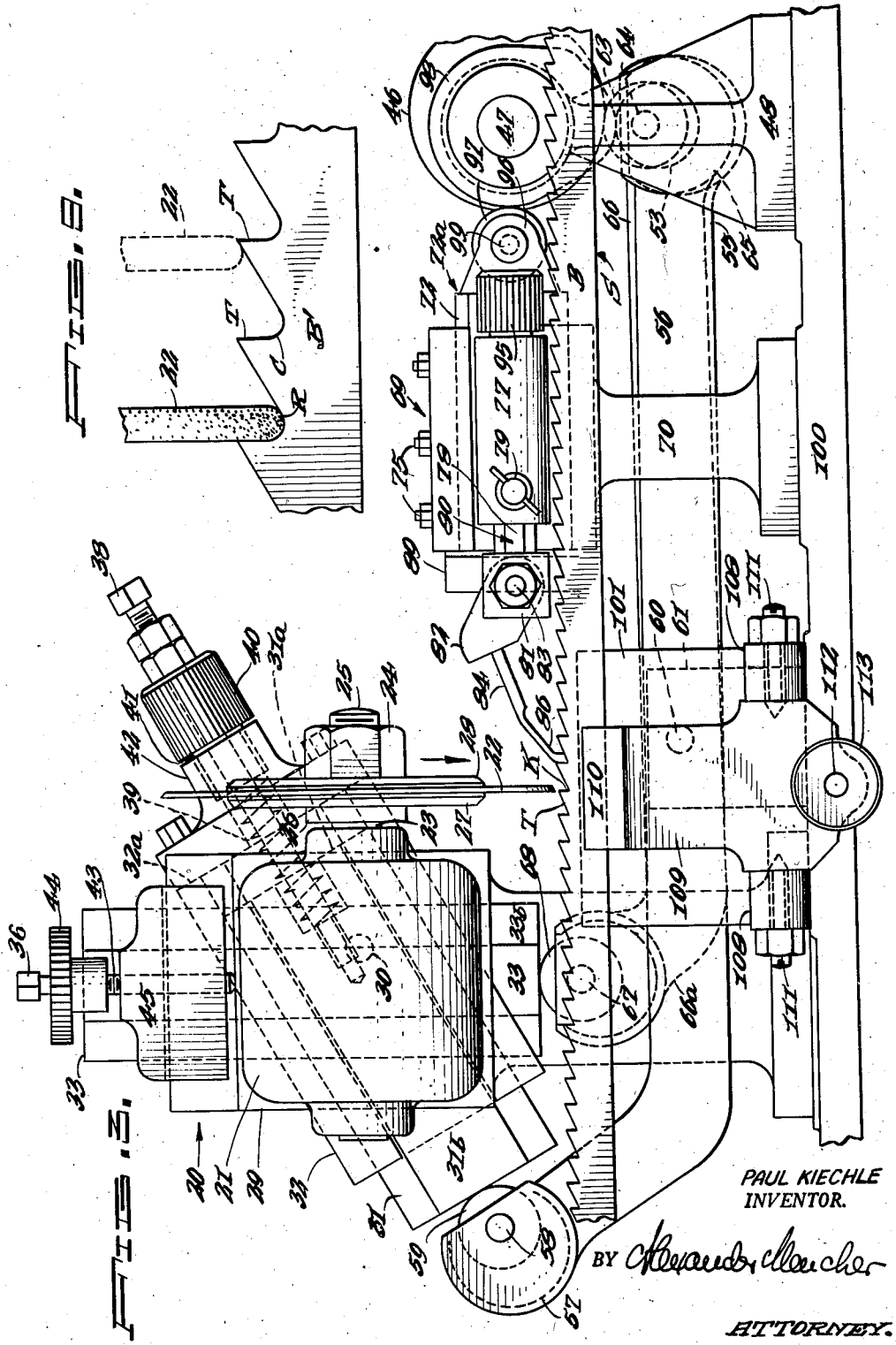

July 3, 1945.   P. KIECHLE   2,379,642
SAW GRINDING DEVICE
Filed Oct. 14, 1943   5 Sheets-Sheet 3
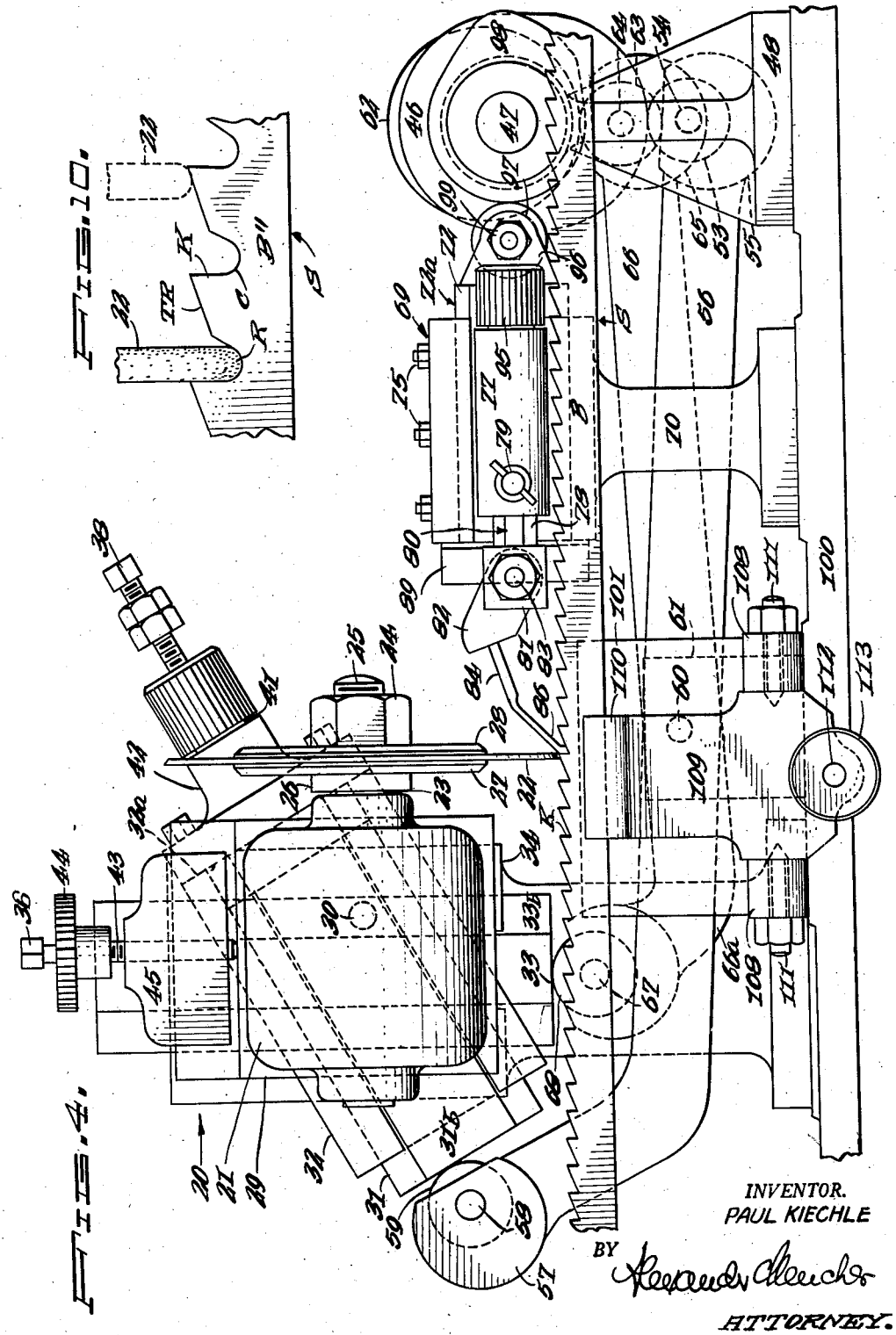
INVENTOR.
PAUL KIECHLE
BY
ATTORNEY.

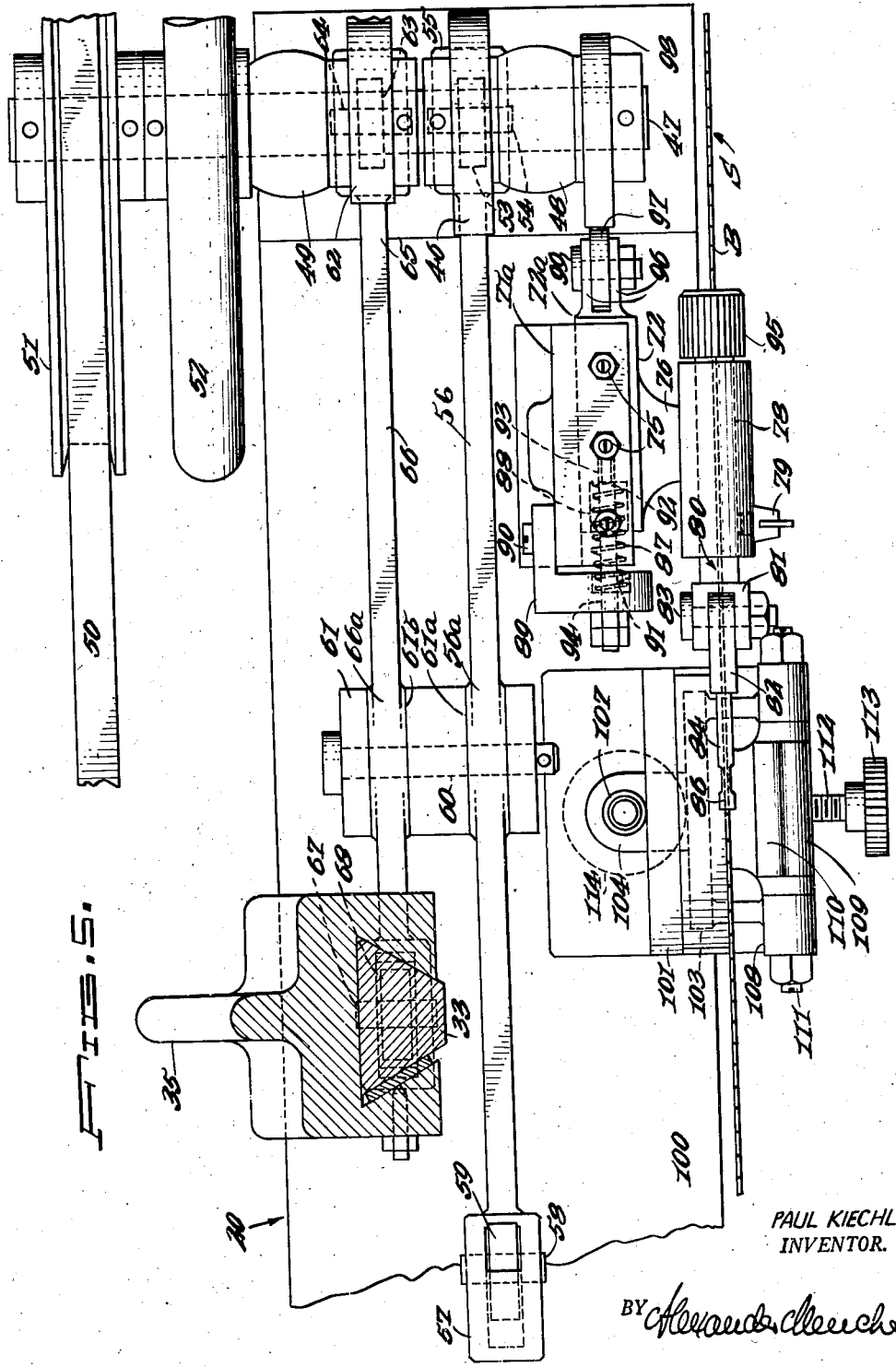

July 3, 1945.  P. KIECHLE  2,379,642
SAW GRINDING DEVICE
Filed Oct. 14, 1943  5 Sheets-Sheet 5
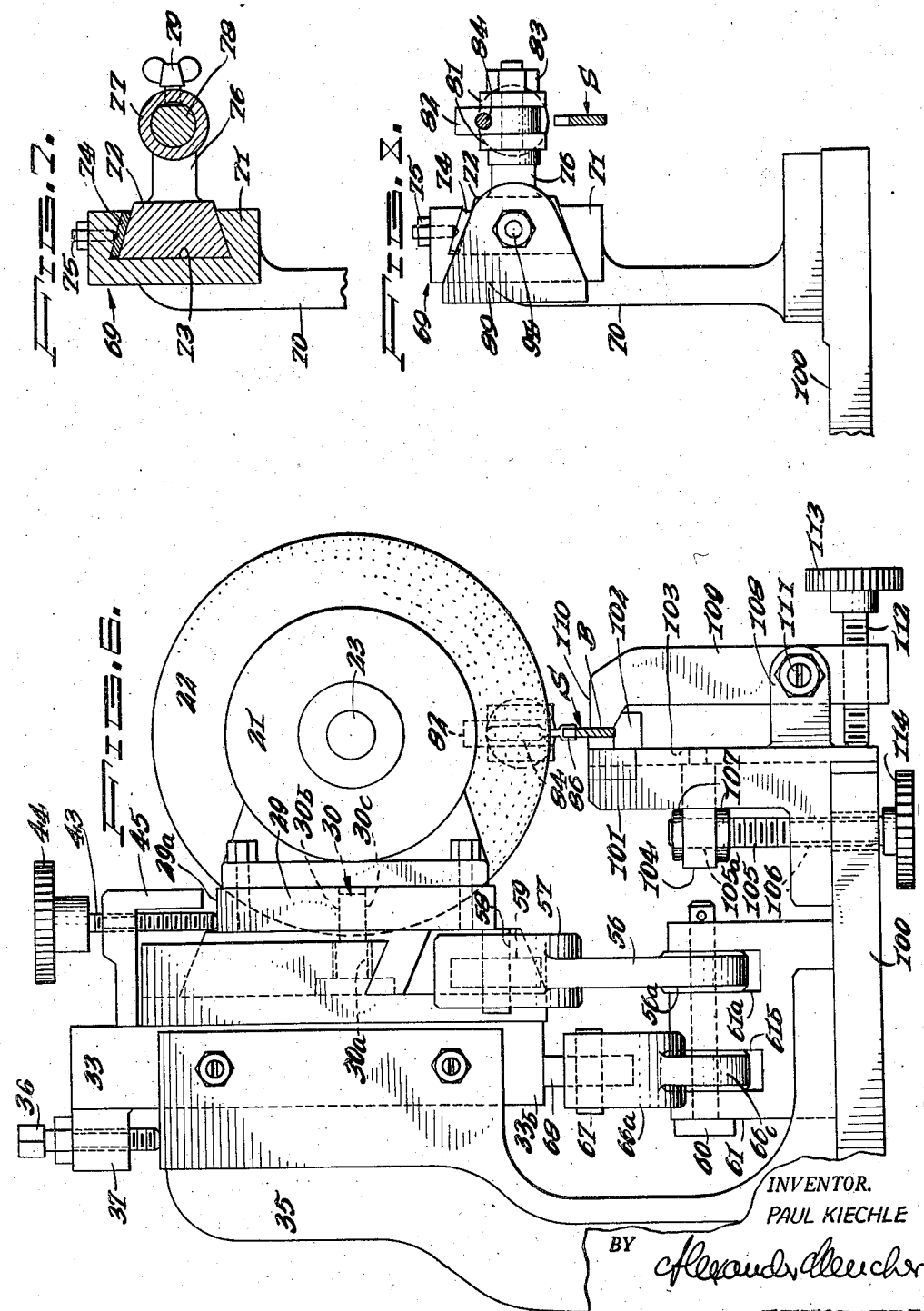
INVENTOR.
PAUL KIECHLE
BY
ATTORNEY.

Patented July 3, 1945

2,379,642

UNITED STATES PATENT OFFICE 2,379,642

SAW GRINDING DEVICE

Paul Kiechle, New York, N. Y.

Application October 14, 1943, Serial No. 506,208

4 Claims. (Cl. 76—41)

This invention relates to devices for grinding and sharpening saws or the like and more particularly to machines for forming the teeth of endless or continuous band saws such as are used in the steel and wood industry.

In the applicant's invention an annular rotary grinding disk, of carborundum or such like material, is used to grind the teeth of the band saw to the desired shape and depth, the latter being attached to a fast electric motor that is fastened upon a platform which is made to move vertically and horizontally through the medium of a set of rotating cams and pivotably mounted levers. In addition the invention provides means for tilting the electric motor and rotary cutter means respectively upon a vertical plane relative to the position of the band saw, to take care of the vertical inclination of the teeth of the blade.

A further object of this invention is to provide a band saw grinding machine which will utilize a very thin circular rotating grinding stone, the latter being driven at high speed by means of an electric motor.

Another object of this invention is to provide horizontal feeding means to facilitate the moving of the grinding stone along the inclined portion of the teeth of the band saw. A still another object of this invention is to provide vertical adjusting means to facilitate the sliding (raising or lowering) of the grinding stone along the top and bottom or cutting edge of the teeth of the band saw.

An additional object of this invention is to provide means for feeding the band saw at least one tooth at a time in step-like movement, and clamping means for holding the blade in position during the tooth grinding operation.

A further object of this invention is to provide cam means to facilitate the activation of the rotating grinding wheel along the inclined portion of the tooth and reciprocating means for advancing the band saw at least one tooth at a time.

A still further object of this invention is to provide setting at a tangent means to facilitate the tilting of the circular grinding stone upon diverse diagonal planes relative to the position of the band saw and means for adjusting the tilting angle of the filing wheel.

A still additional object of this invention is to provide means for adjusting the vertical position of the band saw to take care of the difference in width and the depth of band saws of standard make.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is a front elevation of the band saw grinding machine showing the circular filing disk and the mechanism for advancing the blade one tooth at a time.

Fig. 2 illustrates portions of different saw blades, each differentiating solely in the vertical inclination of their teeth. It also shows the required angle of inclination of the grinding wheel which corresponds with the vertical inclination of the tooth of the blades.

Fig. 3 is a front elevation of the band saw grinding machine shown in Fig. 1, showing the position of the circular grinding disk before descending along the vertical portion or cutting edge of the tooth of the band saw.

Fig. 4 is a front elevation showing the position of the grinding disk after ascending along the inclined portion of the tooth of the endless saw.

Fig. 5 is a horizontal cross-section taken on a line 5—5 of Fig. 1 showing the cam arrangement and the feeding means for advancing the band saw blade one tooth at a time.

Fig. 6 is a side view taken along the line 6—6 of Fig. 1 showing the platform on which the electric motor and grinding disk respectively are attached to and the clamping arrangement for clamping the band saw in position during the tooth grinding operation.

Fig. 7 is a section taken on the line 7—7 of Fig. 1 showing the sliding dovetail arrangement to facilitate the advancing of the band saw one tooth at a time.

Fig. 8 is a section taken on a line 8—8 of Fig. 1 showing further details of the sliding arrangement for advancing the band saw one tooth at a time.

Fig. 9 is illustrative of a modification of the cross section of the rotating grinding disk used in Figs. 1 to 8 inclusive. In the present case the outside circumference of the grinding stone is rounded up to facilitate the grinding of new teeth having a circular base.

Fig. 10 illustrates another modification of the grinding disk and saw blade shown in Fig. 1. In this particular case the grinding disk is operated in such a manner as to implant a circular base to the teeth of the saw and to grind a trapeze-shaped cutting edge thereto.

Referring to Fig. 1, 20 represents the band saw grinding machine described in this application wherein 21 is the electric motor used for rotating the thin grinding disk 22, the latter being attached to the driving shaft 23 of the electric motor 21 by means of a nut 24 which is threaded upon the threaded extension 25 of the shaft 23. In addition the driving shaft 23 has a circular stop 26 and a pair of disks 27 and 28 which are placed on either side of the circular disk 22 before tightening the nut 24 upon the threaded extension 25.

The motor 21 is attached upon a base 29 which is made to tilt upon a vertical plane through the medium of a swivel point 30. The swivel 30 consists of a bolt 30a that is securely held within the sliding dovetailed member 31, and an extension 30b which is fitted within a reamed hole 31c in the base 29. The dovetailed member 31 is made to slide within a dovetailed plate 32 which is attached to a secondary vertically sliding dovetailed member 33 that is slidably held within the dovetailed portion 34 of the upright supporting casting 35. The dovetailed member 33 has a stop which comprises an adjustable screw 36 threaded within an extension 37 attached to the upper portion of the member 33 (see Fig. 6). The dovetailed member 31 has also an adjustable stop which consists of an adjustable screw 38 threaded within the upper end 31a of the member 31. A compression spring 39 is placed between the upper portion 31a of the dovetailed member 31 and an adjustable knob 40. The knob 40 has a threaded extension 41 which is threaded within an end casting 42 that is attached to the upper portion 32a of the dovetailed plate 32. In addition an adjustable screw 43 that has a knob 44 is threaded within an angle-shaped extension 45 of the sliding dovetailed member 33. The adjustable screw 43 is located off center in respect to the center of the swivel point 30 and contacts the upper portion 29a of the base 29. The screw 43 is used to tilt the base upon the swivel point 30 to the desired angle corresponding to the angle of inclination of the vertical portion of the cutting edge of the teeth of the blade.

Referring to Fig. 5 which illustrates in detail the cam arrangement and the swivel point levers for projecting the grinding disk in a vertical and horizontal plane, the cam 46 is attached to the cam-operating shaft 47 which is rotated within the bearings 48 and 49 and is driven by V-belt 50 and a V-pulley 51, both driven by an electric motor (not shown). A hand wheel 52 is also attached upon the shaft 47 to be used for manual operation when it is necessary to set the grinding machine 20 before the tooth filing operation.

The cam 46 contacts a roller 53 which is held upon a stud 54 fastened to the right side end 55 of the pivotally mounted rocker arm 56. The left end 57 of the rocker arm 56 also has a pivoting stud 58 having a roller 59 which contacts the lower portion 31b of the dovetailed member 31. The rocker arm 56 is pivotally mounted upon a stud 60 that is held within a vertical block 61 (see Fig. 5). The portion 56a of the said rocker arm 56 that is pivoted upon the stud 60 is fitted within a vertical groove 61a that is cut within the block 61.

A cam 62 which is also attached upon the driving shaft 47 contacts a secondary roller 63 which is held upon a stub 64 the latter held within the right end 65 of the pivotally mounted rocker arm 66. The left end 66a of the lever 66 has also a stud 67 with a roller 68 mounted therein and in contact with the lower portion 33b of the horizontally movable dovetailed member 33. The portion 66a of the rocker arm 66 is fitted within a vertical groove 61b, cut within the block 61, and like the rocker arm 56 is pivoted upon the stud 60.

In Figs. 1, 3, 4, 5, 7 and 8 there is shown the manner the blade of the saw is moved automatically after a complete grinding operation upon the cutting edge of one tooth and the inclined face of the adjacent tooth. The mechanism 69 used in advancing the blade B of the band saw S comprises an upright base member 70 with a dovetailed elongated portion 71, the latter supporting a dovetailed bar 72 which moves within the dovetailed groove 73 and is made to slide snugly through a plate 74 and adjustable pressure screws 75. The dovetailed member 72 has an extension 76 which carries a tubular member 77 supporting an adjustable rod 78. The rod 78 slides within the tubular member 77 and is made fast through a locating screw 79. The left side end 80 of the adjustable rod 78 has a pair of ears 81 which support a flat block 82, the latter held to said ears through the medium of a screw and bolt 83. A guiding member 84 is secured to the portion 85 of the block 82 and ends in a ratchet-shaped portion 86. The portion 86 of the guiding member 84 is shaped to fit within the cutting edge K of the blade B of the band saw S. Referring to Fig. 5 it can be seen that a compression spring 87 is placed within a hollow portion 88 of the dovetailed member 72 of the blade-advancing device 69 and a L-shaped bracket 89 is attached by means of a screw 90 to the back 71a of the dovetailed portion of the member 70. The left side of the spring 87 is fitted within a hollow portion 91 of the L-shaped member 89 and a rod 92 is fitted within the spring 87. The rod 92 has at one end thereof a threaded portion 93 that is threaded within the dovetailed member 72 while the other end 94 is slidably fitted within an opening in the L-shaped member 89. The end 94 of the rod 92 carries a pair of nuts which serve as a stop and are also used to adjust the amount of motion of the blade-advancing device 70. In addition an adjustable knob 95 is threaded upon the right side of the rod 80 and is used to calibrate the length of the stroke the blade-advancing device has to supply to advance the blade one tooth at a time and depending upon the pitch of the teeth of the band saw. The right side end 72a of the dovetailed member 72 has a pair of extending ears 96 which support a roller 97, the latter contacting a cam 98 that is rigidly held upon the driving shaft 47. The roller 97 is rotatably held within the ears 96 through the medium of a bolt and nut 99. The band saw blade S is supported upon the base plate 100 by means of an upright L-shaped member 101 which has an adjustable portion 102. The adjustable portion 102 is located under the bottom of the band saw blade B and is raised or lowered through the medium of a sliding plate 103 which has an extension 104 that is supported by an adjustable screw 105, the latter being threaded within the threaded portion 106 at the base of the L-shaped member 101. The upper end 105a of the adjustable screw 105 is rotatably held within the extension 104 through the medium of a pair of collars 107, while L-shaped upright has a pair of extending members 108 which serve to support a clamping arm 109 that has a clamping portion 110 facilitating the clamping of the blade B within the clamping device 101. The lower portion of the clamping member 109 is hinged within the hinge extensions 108 by means of the pivots 111 and carries an adjustable tightening screw 112 which has a tightening knob 113. The adjusting screw 105 has also a knob 114 that is used for manual adjustment of the sliding plate 103 and the blade adjusting portion 102 respectively.

Referring to Fig. 2 is illustrated three different ways the cutting edge K of the blade B is ground. It can be seen that in the case of the blade I the grinding wheel 22 is on a line 90 degrees parallel to the cutting edge K of the tooth T of the blade B, while in the case of blade II it is somewhat inclined towards the right although it is still parallel with the cutting edge K. In the last case of blade III the grinding disk 22 is inclined towards the left. It is understood that any angle of inclination of the disk 22 can be procured and this is accomplished by turning upon the knob 44 rotating the adjustable screw 43 that serves to tilt the base plate 29 upon the swivel point 30.

Fig. 9 shows a blade B' having teeth T which have a circular or rounded base C. It can be seen that the grinding disk 22 in this particular case must have a rounded cutting edge R. Similarly in the case of the blade B" shown in Fig. 10 the cutting edge K has a circular base C although a trapeze-shaped tooth TR. In this case the grinding disk 22 has also a circular rounded cutting edge R.

Operation

Referring to Fig. 1 it can be seen that the blade B of the band saw S is placed within the jaws of the clamping device 101, while adjustable knob 113 is rotated by the operator until there is enough pressure applied by the clamping arm 110 against the flat side of the blade leaving just enough clearance to allow the latter to be moved in the direction indicated by the arrow A.

The blade B remains in place within the jaws of the clamping device 101 for a length of time allowing the grinding disk 22 to descend upon the cutting edge K of the tooth T and then advances along the inclined face of the adjacent tooth until it reaches the extreme opposite end that is adjacent to the cutting edge of said adjacent tooth. Once this position is reached by the grinding disk, the latter will start descending along the inclined contour of the tooth to reach the cutting edge of the adjacent tooth from which the grinding has started. The grinding disk 22 will at that point start going upward until it completely clears the top of the said cutting edge.

During the grinding operation the blade-advancing device 69 remains in an inoperative position but as soon as the grinding operation has been completed the blade-advancing device comes into play and advances the blade B of the band saw S one tooth towards the direction of the grinding disk 22. Once the blade has been moved the desired amount the blade-moving device recedes to its original starting position and remains in place ready to advance the blade another tooth after the grinding disk has completed its grinding operation.

In Figs. 1, 3 and 4 inclusive it can be seen that the roller 68 contacts the lower portion 33b of the dovetailed member 33. The dovetail-shaped plate 32 is directly secured upon the dovetailed member 33 in an inclined position corresponding to the angular inclination of the tooth T of the blade B. A secondary dovetailed member 31 is fitted within the dovetail-shaped member 32, and a roller 59 contacts the lower portion 31b of the dovetailed member 31. The base plate 29 is attached upon the dovetailed member 31a in such a manner as to allow for a considerable amount of angular tilting. The tilting of the plate 29 is accomplished through the medium of the pivot point 30 which comprises a bolt 30b fitted within an opening 30c within the base plate 29. The bolt 30b has a threaded portion 30a which is made tight within dovetailed member 31. To facilitate the tilting of the base plate 29 upon the pivot point 30 a knob 44 is rotatably held upon an L-shaped member 45 that is rigidly secured to the dovetailed member 33. The knob 44 has an extending threaded portion 43 which is threaded within the L-shaped member 45 and contacts the upper portion 29a of the base plate 29. Should it be required to change the horizontal position of the grinding disk 22 as shown in Position I of Fig. 2 the knob 44 is turned in a clockwise direction to tilt the base plate 29 downwardly against the swivel point 30 thus forcing the grinding disk 22 to be placed in an inclined position as shown in Position III of Fig. 2. In case it is required to tilt the grinding wheel 22 to a Position II shown in Fig. 2, the knob 44 is rotated in a counterclockwise direction to allow the base plate 29 to be tilted upwardly.

In Fig. 1 the grinding disk 22 is shown in a neutral position while in Fig. 3 the grinding disk 22 is shown descending upon the cutting edge K of the tooth T. This motion is accomplished by lowering the roller 68 which is rotatably held upon the stub 67 that is fastened to the left end 66a of the swivel arm 67. A secondary roller 63 is rotatably held upon a stub 64 attached to the right side 65 of the swivel arm 66. The swivel arm 66 swivels upon the stub 60 that is held within the block 61. A secondary swivel arm 56 also swivels upon the stub 60. The left side end 57 of the arm 56 has a stub 58 having a roller 59 the latter contacting the lower portion 31b of the dovetailed member 31. The right end 55 of the swivel arm 56 also has a stub 54 having a roller 53 the latter contacting a cam 46. The roller 63 that is held by the right side portion 65 of the swivel arm 66 also contacts a cam 62. Both cams 46 and 62 are secured upon a common driving shaft 47 that is rotated through the medium of a V-belt 50 and V-pulley 51. The outside circumference of the cams 46 and 62 is shaped in such a manner as to allow the swivelling of the swivel arms 56 and 66 in timed relation facilitating the upward and downward motion and the sliding movement of the grinding disk 22 along the contour of each of the teeth of the band saw. The cams 46 and 62 are fastened upon the shaft 47 in such a relation that their operation upon the swivel arms 56 and 66 will allow for the grinding disk 22 first, to descend upon the cutting edge of the tooth to be ground, second, to ascend along the inclined face of the adjacent tooth, third, to descend backwards along the said inclined face and, fourth, to ascend upwardly parallel to the said cutting edge of the tooth until said grinding disk will completely clear the cutting edge of the tooth. In other words, the grinding disk 22 has a dual purpose; first, to grind the cutting edge of a tooth and the inclined face of an adjacent tooth and secondly, to have the surface of the said inclined face and said cutting edge in its backward stroke when returning to its original starting position. After the tooth has been ground as above the blade-moving device 70 comes into play and it can be seen from Figs. 1, 3, 4 and 5 respectively that the roller 97 that is fitted within the ears 96 is in contact with a cam 98. The outside circumference of the cam 98 is shaped in such a manner as to become effective only during a portion of its complete revolution. It can be also seen that the cam 98 is attached upon the driving shaft 47 which also supports the cams 46 and 62 respectively. In other words, the rotation of the driving shaft 47 will rotate all three cams 46, 62 and 98 at once although due to their position upon the shaft 47 they will become effective in different portions during a complete revolution of the shaft 47. The cam 98 is therefore attached to the shaft 47 in such a way as to operate the blade-moving device 70 only after the operation of the cams 46 and 62 has been accomplished and while both of the other cams are in their neutral positions. The outside circumference or shape of the cam 98 has a contour to allow for just enough rise to move the roller 97 and dovetailed member 72 respectively in the direction shown by the arrow X (see Fig. 1), to move the blade B one tooth at a time. The rotation of the cam 98 will allow the roller 97 and member 72 to recede against the pressure of the compression spring 87 thus forcing the blade-guiding figure 84 to be moved one tooth backwards to engage within the cutting edge of the next neighboring tooth to be ground.

It can be seen from the above description that the purpose of the band saw grinding machine consists in holding the blade of the saw in a desired position within the machine, as to allow a grinding disk to be lowered against and parallel with the cutting edge of a tooth and further to facilitate the sliding movement of said grinding disk along the inclined face of the adjacent tooth, then once this operation is ended the disk will return to its original starting position and be moved away from said blade and its contact with the cutting edge of the tooth. After the grinding operation has been completed the blade-moving device comes into play and advances the blade of the saw one tooth at a time in the direction of the grinding disk. The blade B is moved against the pressure of its frictional contact with the clamping device and will remain in position ready for the next grinding operation during which time the blade-advancing device will recede to its original starting position. The tooth grinding and advancing operations continuously succeed each other until all the teeth upon the whole circumference of the band saw are ground. Then the saw is removed by the operator and a new saw is placed within the clamping jaws. It can be also seen that to operate the present device two motors are required, one to operate the grinding wheel and another to rotate the cam shaft for timing the grinding wheel and the blade-advancing device. It is understood that one single motor could be used to operate both grinding and blade advancing mechanisms necessitating the use of a gear box or such like device attached to the motor for providing two separate speeds; one for the grinding wheel, and another for the cam shaft.

The foregoing detailed description of the band saw sharpening machine has been given for clearness of understanding only and no unnecessary limitations should be understood therefrom, but it should be construed as broadly as permissible in view of the prior art.

While the band saw sharpening machine herein illustrated and described is confined to certain structural details, I do not wish to limit myself to such details, but desire to cover all forms and arrangements, being only limited by the scope of the appending claims.

By modifying the holding vise or support indicated by numerals 101—114 and making motor 21 carrying the grinding wheel 22 swivelable in the horizontal as well as in the vertical plane, and advancing the teeth two at a time in cases where cross-cut types of saws are operated upon to permit alternation in grinding the oppositely inclined faces of adjoining teeth, circular wood and metal saws may be sharpened as the band saws under discussion.

What I claim is:

1. A device of the character described comprising a frame, clamping means on said frame adapted to have movably mounted therein a toothed saw body, a vertically disposed support on said frame, a vertically reciprocable turret mounted on said support, an angularly slidable member mounted on said turret, a motor driven cutter disk mounted on said angularly slidable member, means timed to successively move said turret and angularly slidable member for each cycle of operation whereby the cutter disk successively is lowered to cut the cutting edge of a tooth, shifted diagonally to grind the inclined face of the adjacent tooth, returned for descent along said inclined face and for ascent along and above the said cutting edge, and feeder means for the saw body in the clamping means to advance the saw body by intermittent motion one tooth at a time for each cycle of operation by the cutter disk.

2. A device of the character described comprising a frame, clamping means on said frame adapted to have movably mounted therein a toothed saw body, a vertically disposed support on said frame, a vertically reciprocable member mounted on said support, an angularly slidable member mounted on said reciprocable member, a motor driven cutter disk mounted for pivotal adjustment on said angularly slidable member, means timed to successively move said vertically reciprocable member and angularly slidable member for each cycle of operation whereby the cutter disk is lowered to cut the cutting edge of a tooth, shifted diagonally to grind the inclined face of the adjacent tooth, returned for descent along said inclined face and for ascent along and above the said cutting edge, feeder means for the saw body in the clamping means to advance the saw body by intermittent motion one tooth at a time for each cycle of operation by the cutter disk, and adjusting means engageable with the reciprocable and slidable members to control outermost positions thereof in accordance with the dimensions of the cutting edge and inclined face of adjacent teeth.

3. In a device of the character described, a motor driven cutter disk assembly comprising a vertically disposed support, a vertically reciprocal turret mounted on said support, an angularly slidable member mounted on said turret, a motor driven cutter disk mounted on said angularly slidable member, and means timed to successively move said turret and angularly slidable member whereby the cutter disk operates successively in several planes.

4. In a device of the character described a motor driven cutter disk comprising a vertically disposed support, a vertically reciprocal turret mounted on said support, an angularly slidable member mounted on said turret, a motor driven cutter disk mounted for pivotal adjustment on said angularly slidable member, means timed to successively move said turret and angularly slidable member whereby the cutter disk moves in several successive planes and adjusting means engageable with the turret and the angularly slidable member to control outermost positions thereof in accordance with the dimensions of the cutting edge and inclined face of adjacent teeth on which the disk is operable.

PAUL KIECHLE.